Nov. 2, 1937.　　　D. S. BENNETCH　　　2,097,436
TRANSMISSION
Filed May 26, 1933　　　9 Sheets-Sheet 1
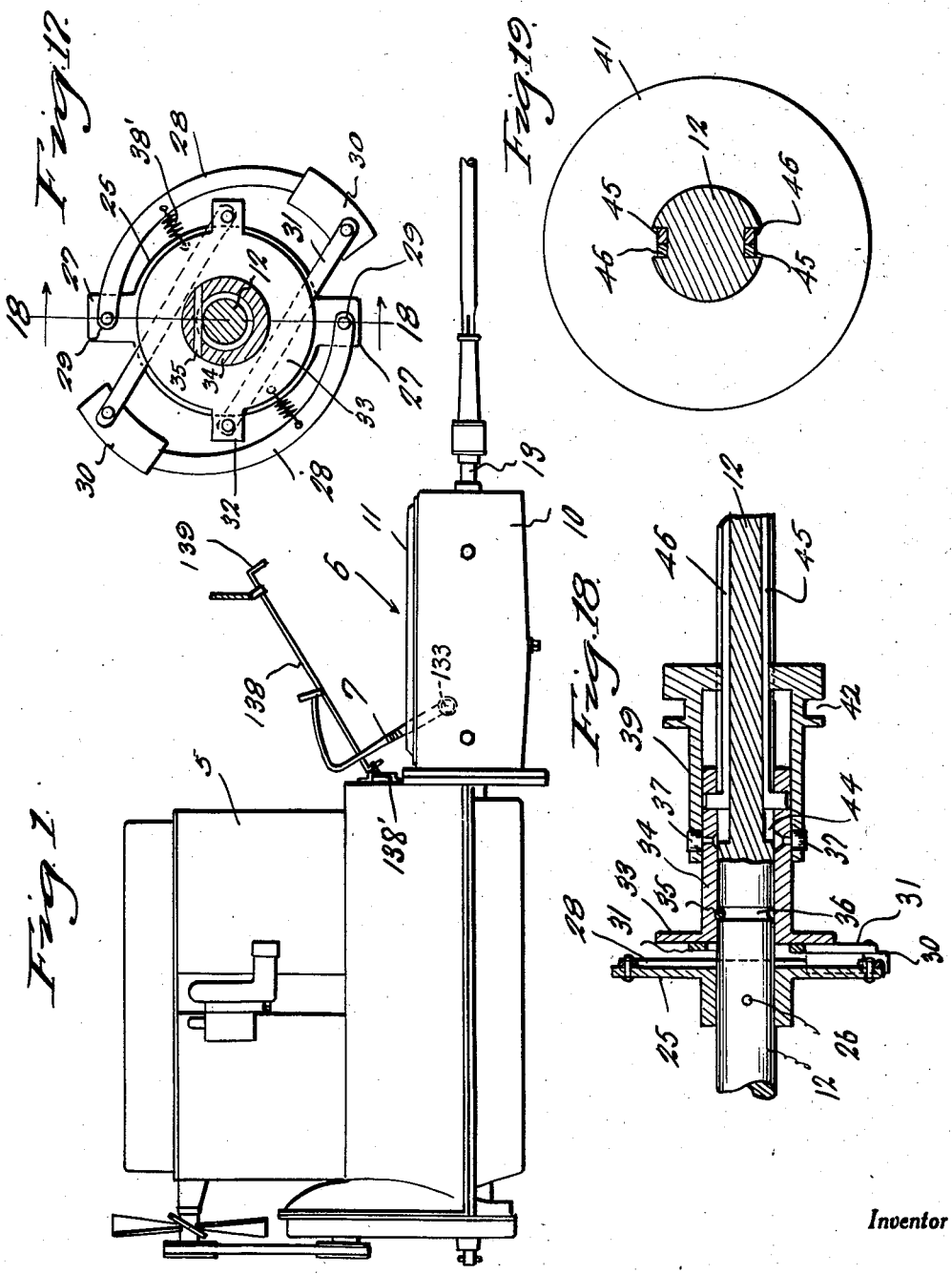
Inventor
David S. Bennetch
By Clarence A. O'Brien
Attorney

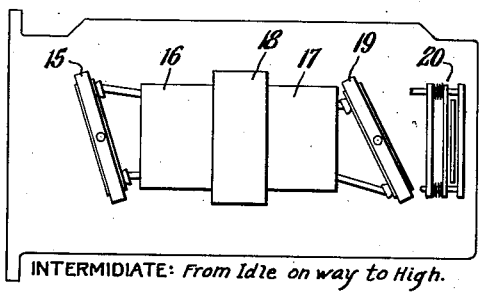
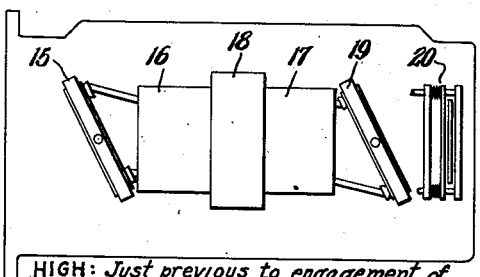
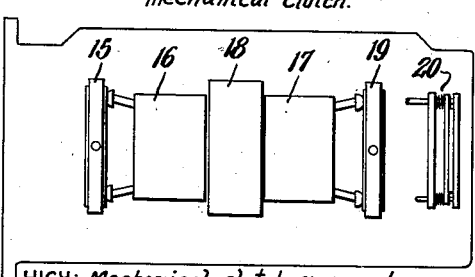
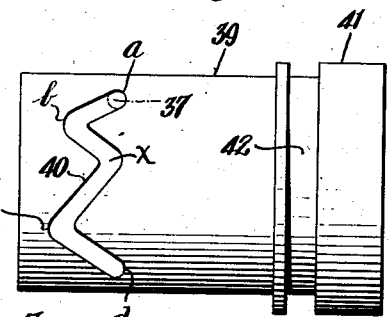
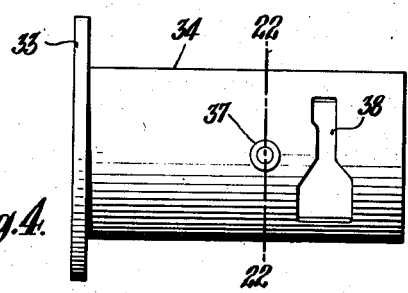
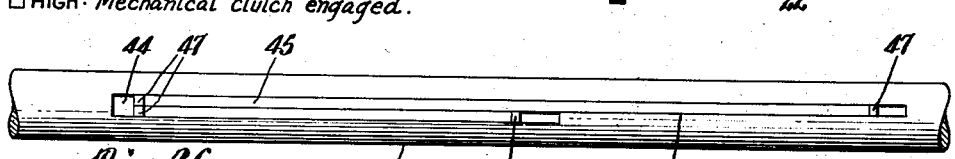
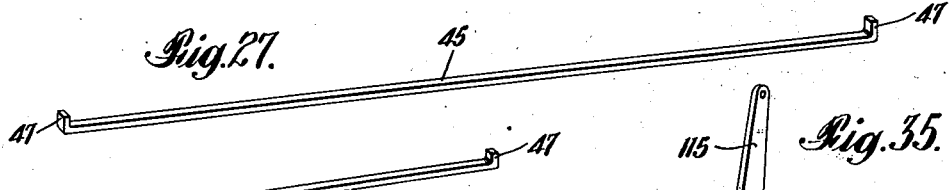
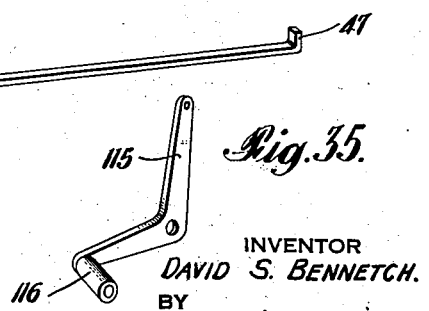

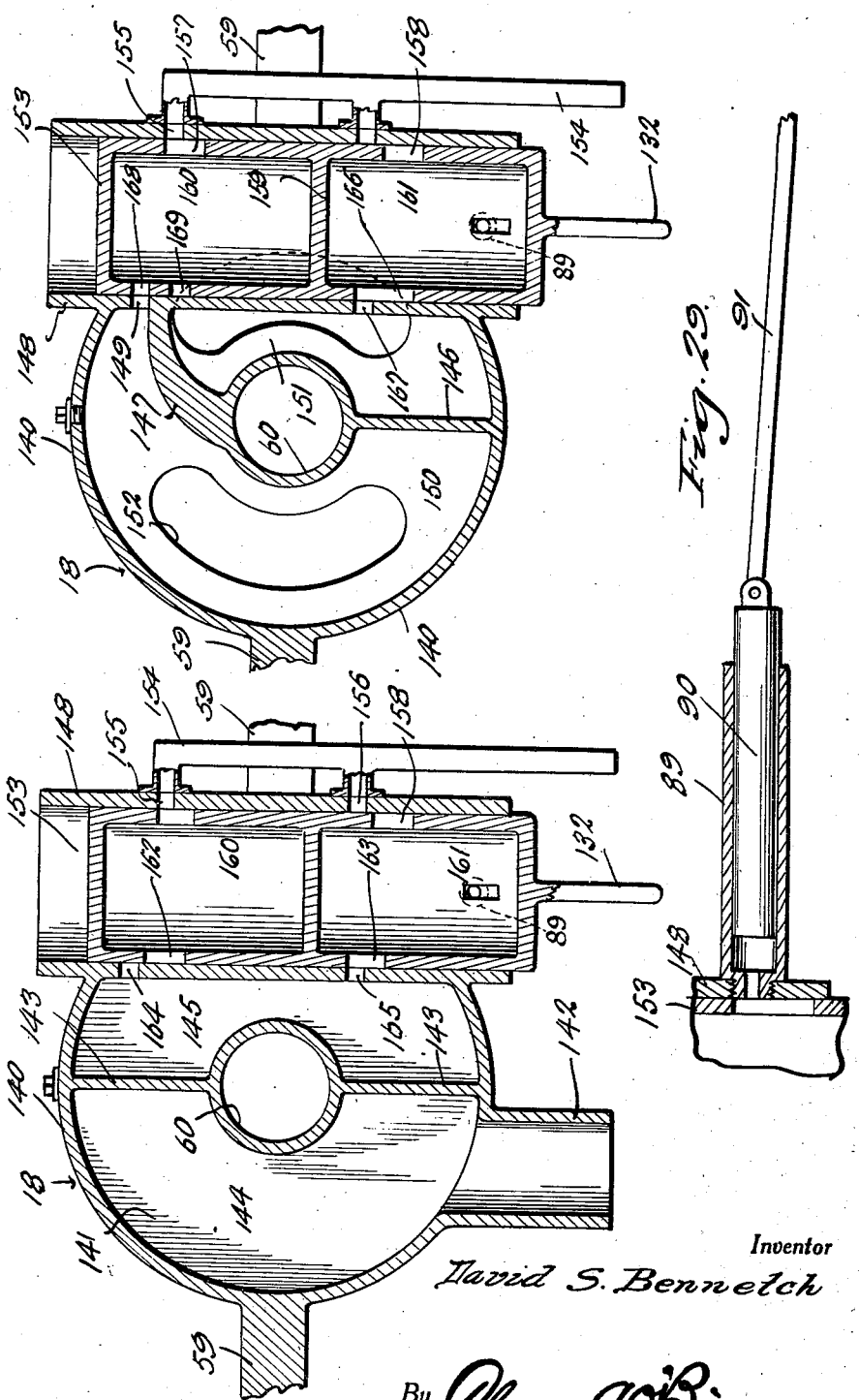

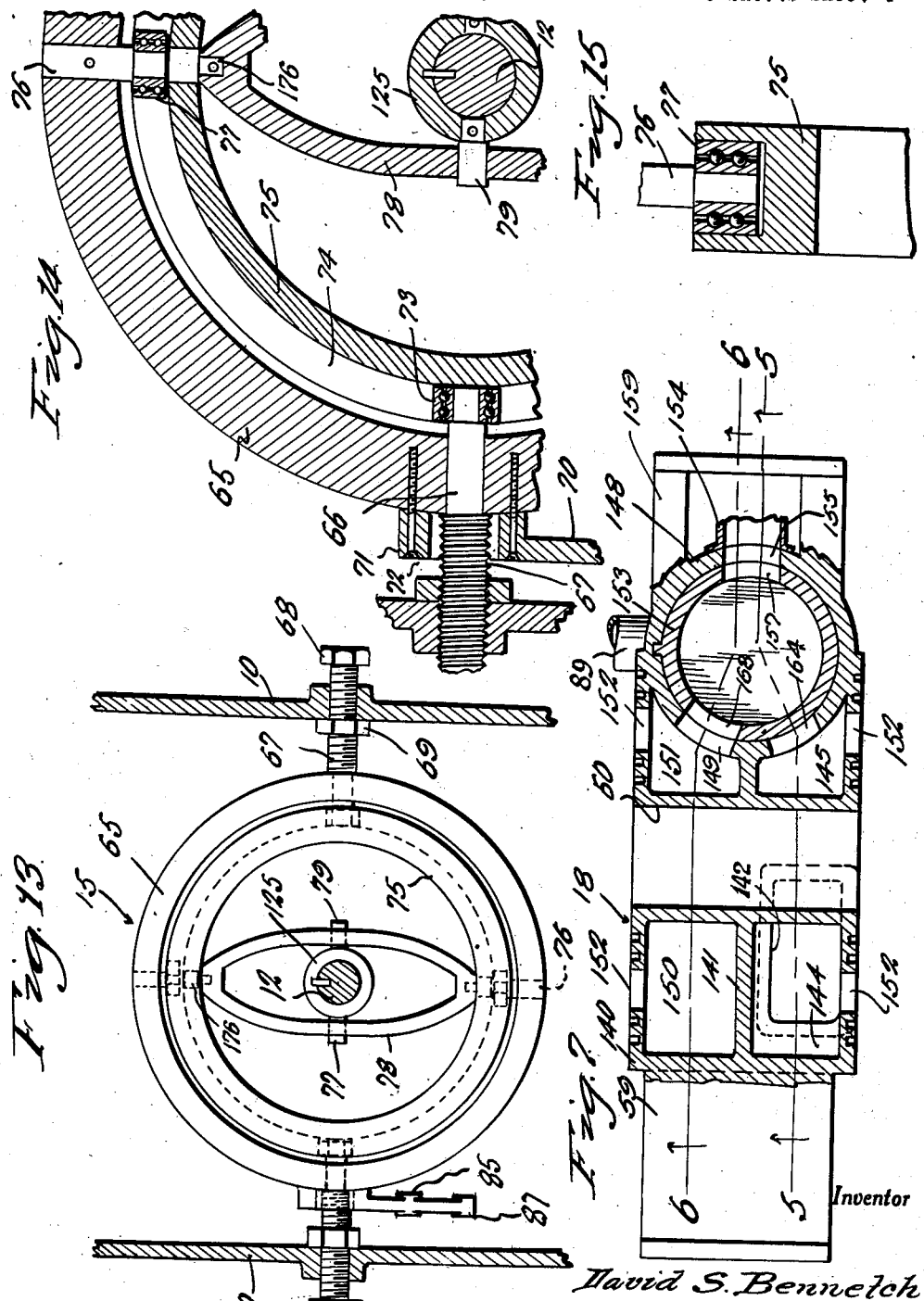

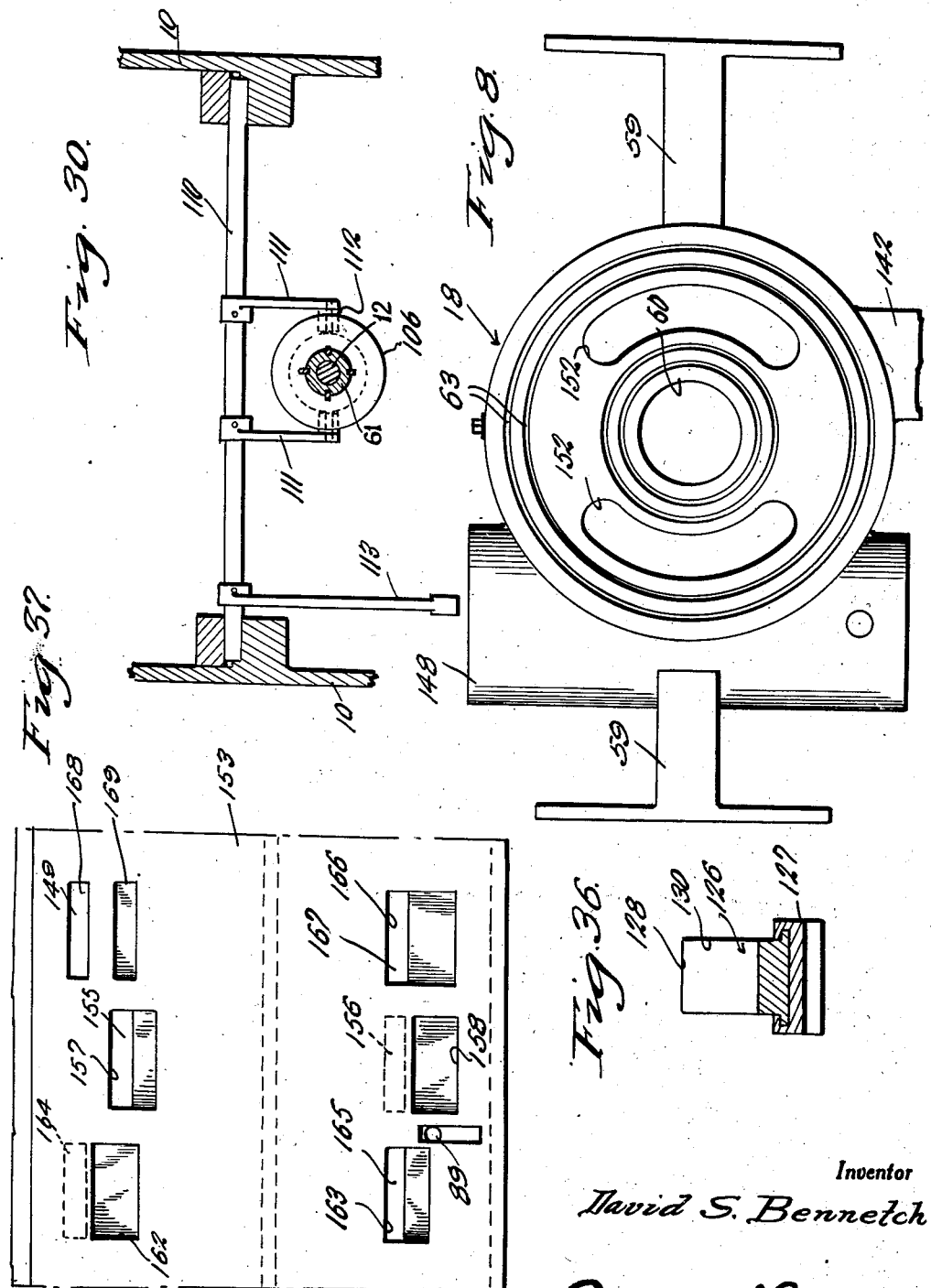

Nov. 2, 1937.  D. S. BENNETCH  2,097,436
TRANSMISSION
Filed May 26, 1933  9 Sheets-Sheet 6
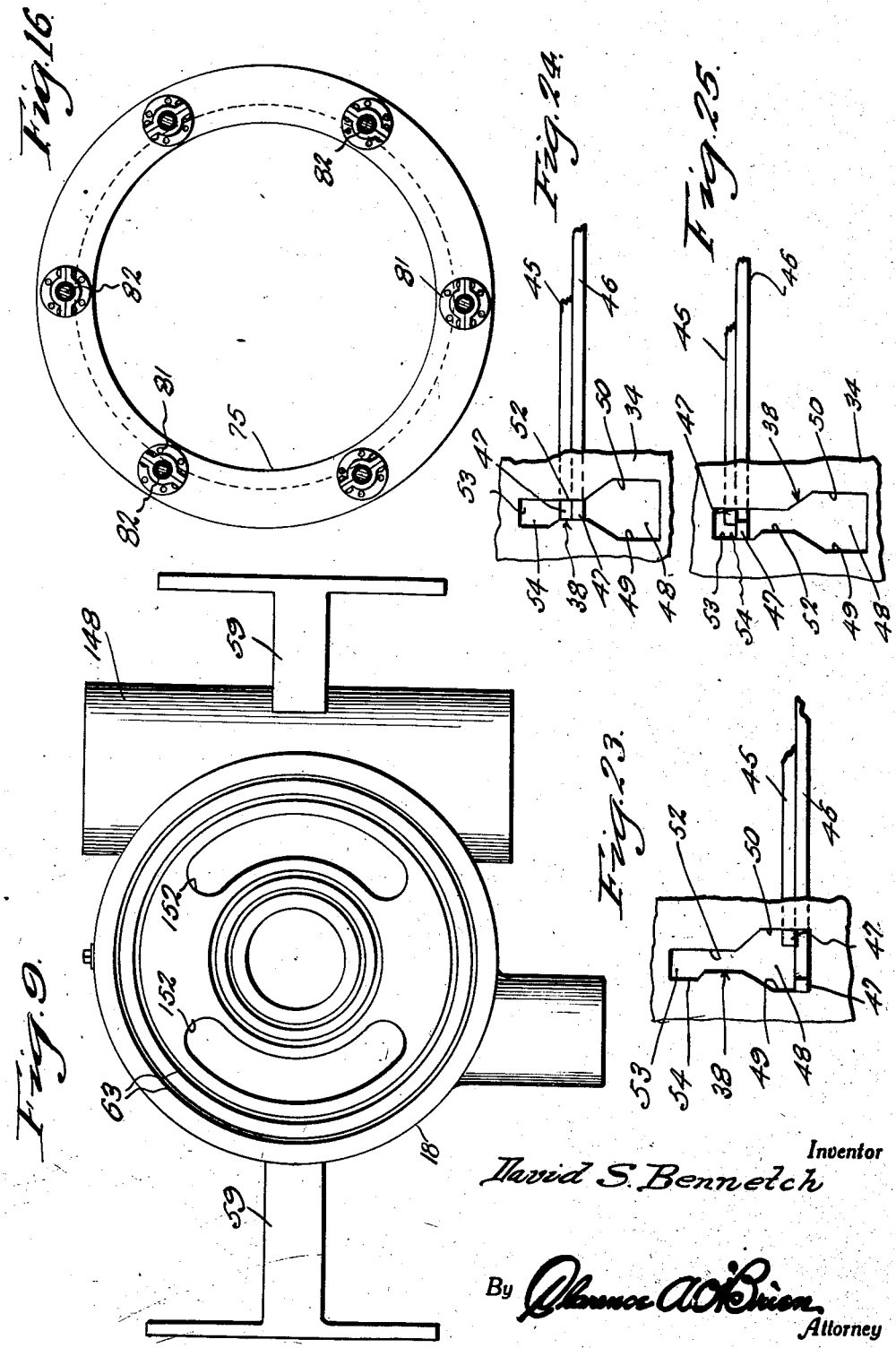
Inventor
David S. Bennetch
By Clarence A. O'Brien
Attorney

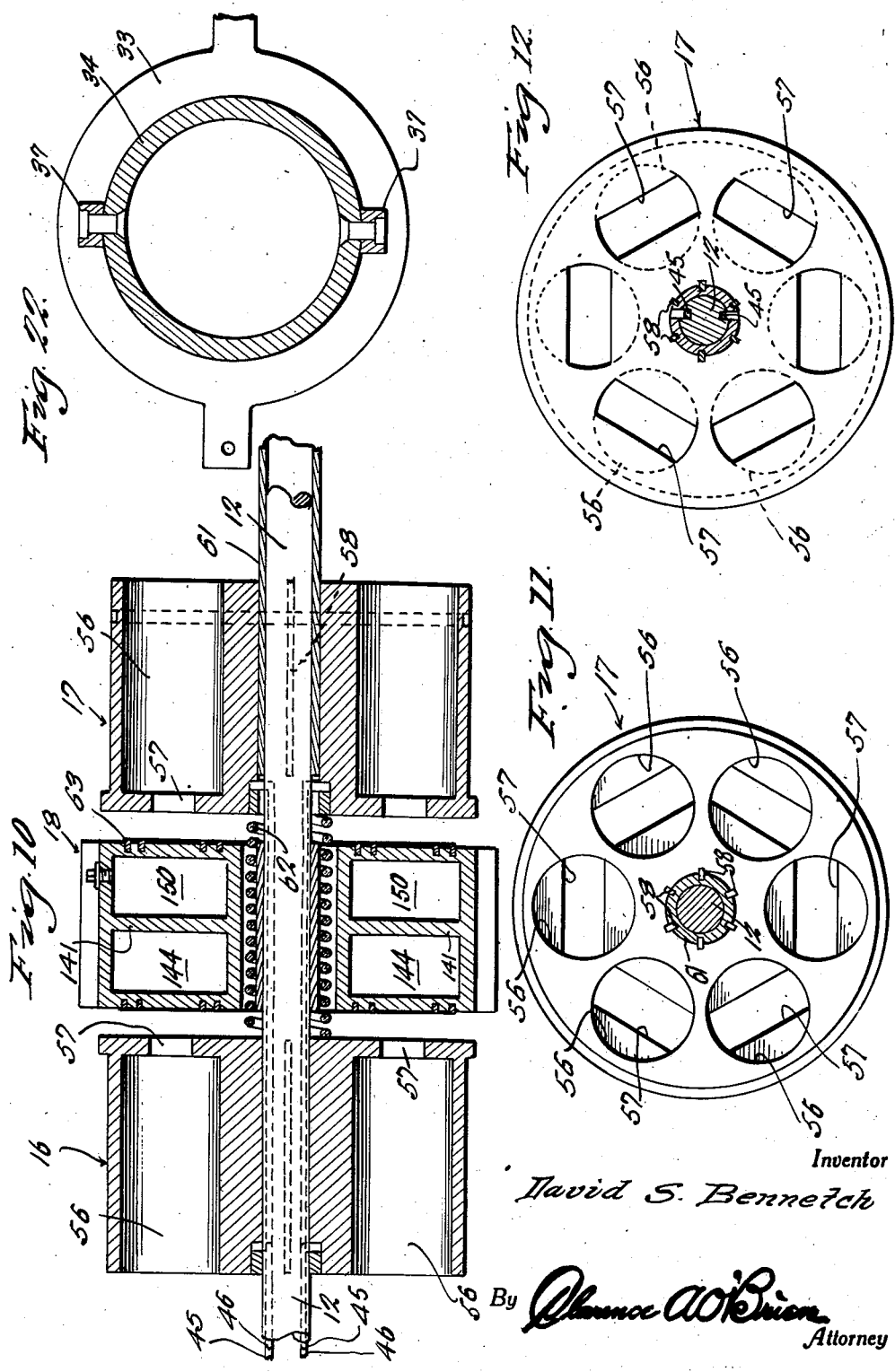

Nov. 2, 1937.   D. S. BENNETCH   2,097,436
TRANSMISSION
Filed May 26, 1933   9 Sheets-Sheet 8
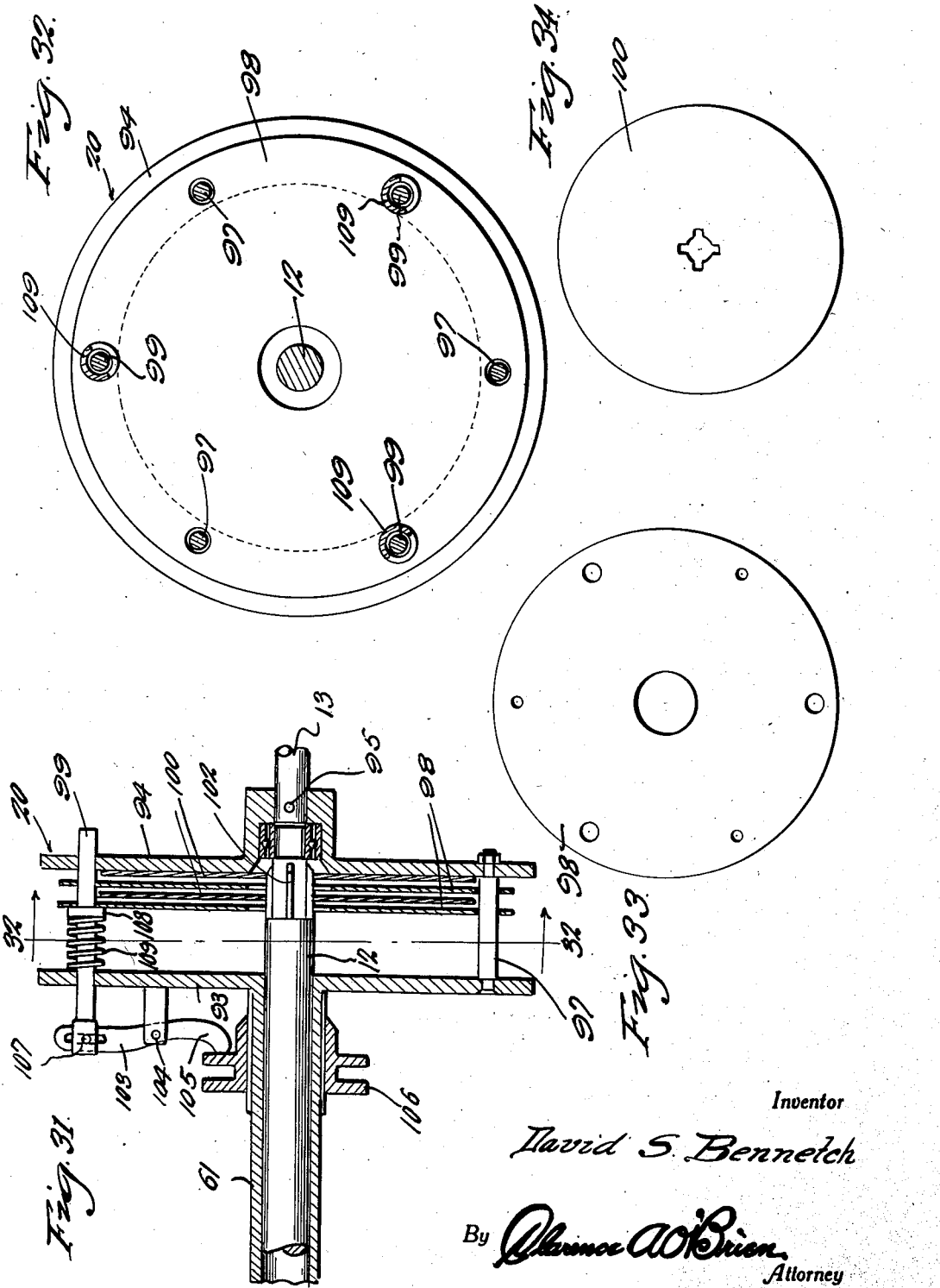
Inventor
David S. Bennetch
By Clarence A. O'Brien
Attorney

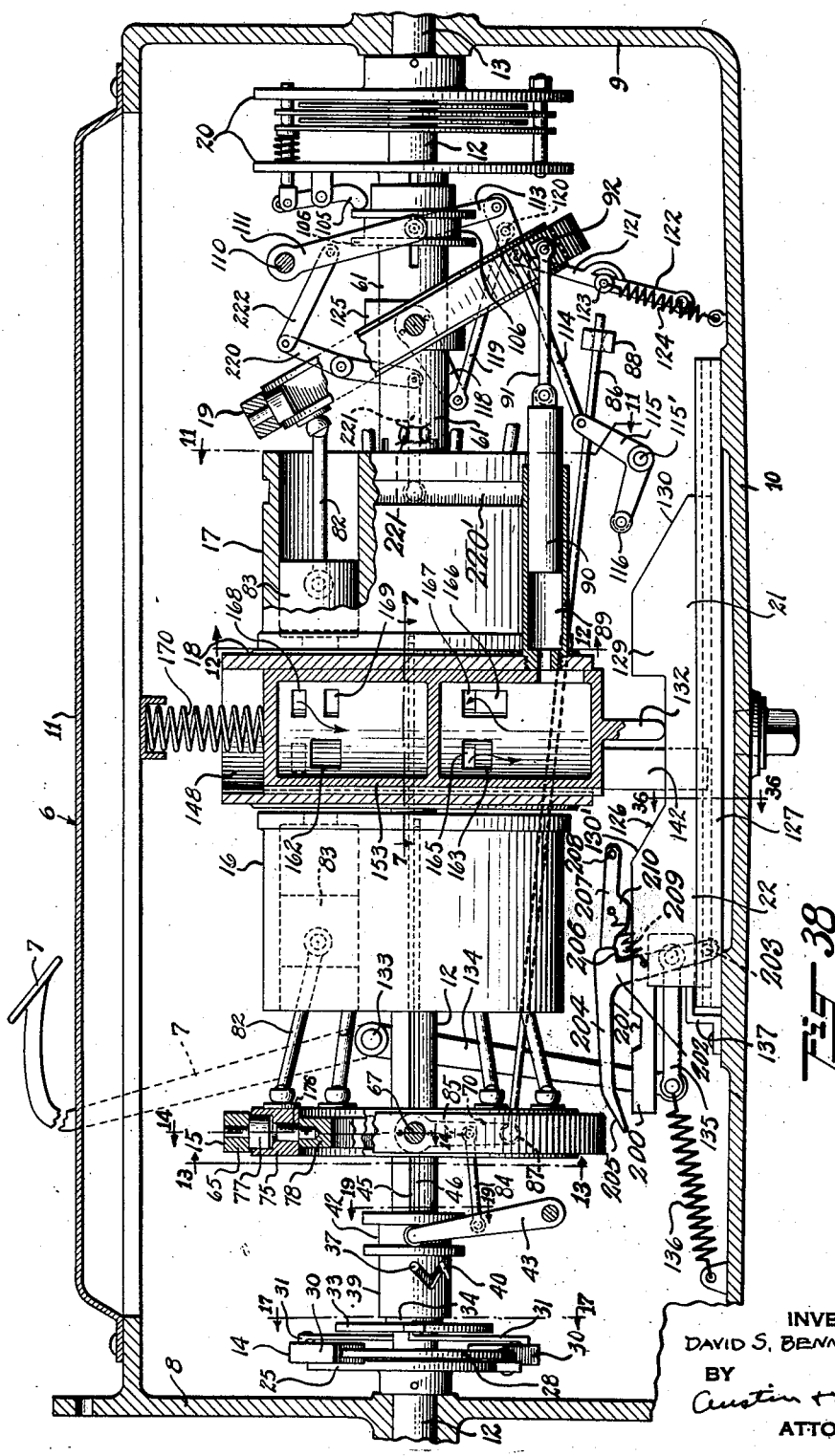

Patented Nov. 2, 1937

2,097,436

UNITED STATES PATENT OFFICE 2,097,436

TRANSMISSION

David S. Bennetch, Sheridan, Pa.

Application May 26, 1933, Serial No. 673,086

12 Claims. (Cl. 60—53)

This invention appertains to new and useful improvements in transmissions for motor vehicles of the type driven by internal combustion engines and the principal object of the present invention is to provide a transmission which will eliminate gear shifting and automatically control the ratio of speed change between the drive and driven shafts.

Another important object of the present invention is to provide a transmission of the fluid controlled type wherein the fluid under compression is utilized to effect braking action of the driven or propeller shaft.

Still another object of importance is to provide a fluid transmission wherein the fluid of the transmission under compression can be used in conjunction with conventional fluid wheel brakes.

These and various other important objects and advantages of the invention will become apparent to the reader of the following specification.

In the drawings:—

Figure 1 represents a side elevational view of an internal combustion engine equipped with the novel transmission means.

Fig. 2 is a diagrammatic view of the transmission illustrating the positions of the swash plates and mechanical clutch between idling and high.

Fig. 3 is a diagrammatic view of the transmission illustrating the positions of the swash plates and mechanical clutch just previous to direct drive.

Fig. 4 is a diagrammatic view of the transmission illustrating the positions of the swash plates and mechanical clutch for direct drive.

Figure 5 represents a vertical sectional view of the valve means in forward speed, this section being through the pump side of the valve at 5—5 of Fig. 7.

Figure 6 represents a vertical sectional view through the valve as shown at 6—6 in Figure 7, this section being taken through the outlet side of the valve.

Figure 7 represents a horizontal sectional view through the valve taken at 7—7 of Fig. 38.

Figure 8 represents an elevational view of the front of the valve structure.

Figure 9 represents an elevational view of the back of the valve structure.

Figure 10 represents a longitudinal sectional view through the piston blocks and valve drum.

Figure 11 represents a vertical sectional view taken substantially on line 11—11 of Figure 38.

Figure 12 represents a vertical sectional view taken substantially on line 12—12 of Figure 38.

Figure 13 represents a vertical sectional view taken substantially on line 13—13 of Figure 38.

Figure 14 represents a fragmentary enlarged sectional view taken substantially on line 14—14 of Figure 38.

Figure 15 represents a fragmentary vertical sectional view through the structure shown in Figure 14.

Figure 16 represents a vertical sectional view through the connecting rod of the forward ring and looking toward the said ring.

Figure 17 represents a vertical sectional view taken substantially on line 17—17 of Figure 38.

Figure 18 represents a fragmentary longitudinal sectional view through the governor controlled means.

Figure 19 represents a vertical sectional view taken substantially on line 19—19 of Figure 38.

Figure 20 represents a side elevational view of the piston ring controlling cam.

Figure 21 represents a side elevational view of the drum's controlling ring.

Figure 22 represents a cross sectional view taken substantially on line 22—22 of Figure 21.

Figure 23 represents a fragmentary elevational view of the drum's controlling cam in high speed or direct drive position.

Figure 24 represents a fragmentary elevational view of the drum's controlling cam, with the parts in low or intermediate speed position.

Figure 25 represents a fragmentary elevational view of the cylinder block's controlling means in idling or neutal position.

Figure 26 represents a fragmentary top plan view of the drive shaft, with the slide rods mounted therein.

Figure 27 represents a perspective view of the rod for controlling the rear piston block.

Figure 28 represents a perspective view of the rod for controlling the forward piston block.

Figure 29 represents a fragmentary sectional view of the means for resetting the rear piston rod ring.

Figure 30 represents a vertical sectional view disclosing the clutch operating collar.

Figure 31 represents a fragmentary enlarged vertical sectional view through the clutch unit.

Figure 32 represents a vertical sectional view taken substantially on line 32—32 of Figure 31.

Figure 33 represents an elevational view of one of the movable clutch plates.

Figure 34 represents an elevational view of one of the free clutch plates.

Figure 35 represents a perspective view of the clutch throw bell crank.

Figure 36 represents a vertical sectional view through the slide cam shown in Figure 38.

Figure 37 represents a lay-out of the control valve.

Figure 38 is a side elevation, with parts broken away, of the entire transmission assembly.

Referring to the drawings wherein like numerals designate like parts, it can be seen that numeral 5 represents in Figure 1, an internal combustion engine. Numeral 6 generally refers to the novel transmission and numeral 7 represents the clutch pedal which also controls the brake.

Referring to Figure 38, it can be seen that this transmission 6 includes the casing headers 8—9, the bottom and side wall 10 and the removable cover plate 11. Extending through the front header 8 is the drive shaft 12, while extending through the rear header 9 is the driven shaft 13.

Briefly, it will be understood that the governor mechanism 14 is responsive to the speed of the drive shaft 12 and controls the pump pistons by means of the carrier or drive ring assembly, generally referred to by numeral 15, as well as to also serve to operate both of the piston blocks, generally referred to by numerals 16 and 17. Numeral 18 generally refers to the valve drum between the piston blocks 16—17 and this valve unit serves to regulate the flow of fluid from the pump block 16 to the motor block 17, the latter in turn driving the ring assembly, generally referred to by numeral 19, which in turn controls the clutch mechanism 20 in response to the speed of the vehicle.

Numeral 21 generally refers to the cam for controlling the clutch mechanism 20, while numeral 22 represents the cam for controlling the valve drum 18 and effecting a braking action in the transmission.

The governor mechanisms will be first described in detail. This governor mechanism (Figs. 17 and 18) consists of a wheel 25 pinned to the drive shaft 12, as at 26, this wheel 25 being provided with a pair of diametrically located peripheral ears 27—27 to which the weight arms 28—28 are pivotally connected, as at 29. Each of these arms 28 is provided with a weight 30 at its free end and each weight 30 is connected by a link 31 pivotally to a corresponding ear 32 on the circumferential flange 33 of the sleeve 34, which sleeve is swivelly connected to the shaft 12 by having a cross pin 35 therein bearing into the circumferential groove 36 of the shaft 12. This sleeve 34, as is clearly shown in Figure 21, has a roller 37 mounted thereon and a slot, generally referred to by numeral 38.

Referring to the governor mechanism shown in Figure 17, it can be seen that coiled springs 38' are interposed between the arms 28 and the aforementioned plate 25 to normally maintain the said arms contracted so that they will not expand until a certain speed of the shaft 12 has been reached.

Telescoping the sleeve 34 is the sleeve 39 which has the slot-way, generally referred to by numeral 40 therein and this slot-way 40 receives the aforementioned roller 37 on the sleeve 34. This sleeve 39 has a head structure 41 which is circumferentially grooved to provide the channel-way 42 for the trunnions of the yoke 43. (See Figure 38.)

Diametrically opposite side portions of the drive shaft 12 (Fig. 18) are provided with longitudinally extending slots 44 and each of these slots receives a pair of slidable rods 45—46, each of which is provided with a lug 47 (Fig. 28) at each of its ends. The slot 44 is provided with an extension 48 for accommodating the longer rod 45. The rod 46 controls the piston block 16, while the rod 45 controls the piston block 17 and as is clearly shown in Figure 18, as well as in Figure 19, there are two sets of these rods.

The slot-way 40 in the sleeve 39 controls the thrust of the sleeve 39 and the positioning of the pistons in the piston block 16 through the action of the ring assembly 15. When the roller 37 has moved from the position a to the position b, (Fig. 20), the ring assembly 15 has been moved from vertical to the position shown in Figure 2. As roller 37 moves from b to x, ring assembly 15 goes back to vertical. This action is explained more in detail hereinafter.

When the roller 37 proceeds from x to the position c in the slot-way 40, the ring assembly 15 has been removed from vertical to a greater slant and to the position shown in Figure 3.

When high speed of the engine has been reached and the ring 15 and piston block 16 are to return to the position shown in Figure 4, the roller has reached the position d in Figure 20.

For positively actuating the piston blocks 16 and 17, it can be seen that the forward lugs 47 of the long and short rods 45 and 46, which fit in the slot 38 of the sleeve 34, will be shifted by the actuation of the sleeve 34. Normally at high speed the lugs 47 will rest in the pocket 48 of the slot 38, this pocket 48 being provided with a shorter side wall 49 for the rod 46 than the side wall 50 for the rod 45 so that the shorter rod 46 will operate primarily to place the piston or pump unit 16 in position against the control drum 18 so that the fluid can be sucked into the unit 16 where it is pumped through the control drum 18 and by the time it is ready to be forced into the unit 17, the rod 45 has acted to bring this unit 17 against the drum 18. The reason for engaging unit 16 with drum 18 before engagement between unit 17 and drum 18 is to suck oil from the reservoir and leave opening for air to pass out of unit 16 and drum 18. When both of the rods 45 and 46 of each pair have their lugs engaged in the narrow canal 52, the two piston blocks 16 and 17 are contacting the drum 18, as shown in Figure 2, and this is the low or intermediate speed position of the assembly.

One wall of the canal 52 is continued straight into the pocket 53, while the other side wall of the pocket 53 is offset, as at 54, to accommodate the lug 47 of the rod 46, so that while the rod 45 will be retained in a position maintaining the piston block 17 against the drum 18, the piston block 16 can move away slightly from the drum 18 and this is the idling position of the mechanism. It is necessary to keep drum 18 and unit 17 in contact at this time to obtain braking pressure for causing the transmission to act as a brake.

Referring to Figures 10, 11 and 12, it can be seen that each of the piston blocks 16 and 17 is of substantially the same construction, each block being provided with a plurality of piston bores 56 extending inwardly from its outer end and terminating inwardly of its inner end. At the inner end of each of these blocks 16—17 is a relatively small and substantially rectangular shaped opening 57 whereby each of the bores 56 can communicate with the drum 18 at the proper moment.

As is clearly shown in Figure 11, the block 17 is splined at 58 to a sleeve 61 which is in turn rotatable on the drive shaft 12.

Brace members 59 (Figs. 5, 6, 8 and 9) support the drum 18 in the proper stationary position within the casing 10 and this drum has a hub 60 of sufficient passageway to accommodate the sleeve 61 to which the piston block 17 is secured and a coiled compressible spring 62 which is interposed between the inner ends of the piston blocks 16 and 17 and this spring normally tends to urge the said blocks away from the drum 18. In Figure 10, the drive shaft 12 can be seen extending not only through the block 16, but also through the block 17 and its sleeve 61 and it will further be seen in Figure 10 that suitable packing rings 63 are provided on the opposite sides of the drum 18 for cooperation with the said blocks 16 and 17 to prevent escape of the liquid utilized.

The ring assembly, generally referred to by numeral 15, in Figure 2, is clearly shown in Figures 13 and 14, the same consisting of an outside tiltable, stationary annulus 65 which is provided with openings at a pair of diametrically opposite horizontally spaced points to receive the smooth portions of pins 66 which are threaded as at 67, and threadedly disposed through the side walls of the casing 10. The outer ends of these pins 66 are provided with polygonal shaped heads 68, while jamb nuts 69 are provided thereon at the inside of the casing 10, whereby the position of the pins with respect to the annulus 65 can be fixed.

At one side of the annulus 65 an arm 70 is provided, the same being provided with a head 71 which is provided with an opening sufficiently large to accommodate the corresponding pin 66 and which is positively secured to the annulus 65 by screws 72.

The inner ends of these pins 66 are provided with rollers 73 which ride in the peripheral groove-way 74 of the ring 75 and as is clearly shown in Figure 14, the annulus 65 is provided at its upper portion with an auxiliary pin 76 which, at its lower end, is provided with a roller 77 disposed in the said groove 74. Another auxiliary pin 76 is located at the lower portion of the annulus 65. The member 78 at the inside of the ring 75 is shown connected at its ends to pins 176 journalled in ring 75, while the opposite sides of its intermediate portion receive the oppositely disposed trunnions 79—79 on the hub 125 on the drive shaft 12. Figure 13 shows the front side of the ring assembly 15 and by referring to Figure 16, it can be seen that the rear side of the ring 75 has a plurality of sockets 81 equi-distantly arranged thereon to accommodate the forward ball ends of the connecting rods 82, which connecting rods connect the corresponding piston 83 in the pump piston block 16.

A pivotal link 84 extends from the aforementioned yoke 43 cooperating with the governor sleeve 39, to the aforementioned arm 70 to connect at the point 85 and as is further shown in Figure 38, an elongated rod 86 extends from the lower end of this lever or arm 70, that is, at the point 87 to extend through a guide 88 rearwardly of the block 17 and this serves to control the clutch mechanism, generally referred to by numeral 20.

The rear ring assembly 19 is constructed identically the same as the ring assembly 15, the only exception being that there is a supplemental ring resetting cylinder 89 (Figs. 29 and 38) having a plunger 90 therein connected to an elongated rod 91 having a pivotal connection 92 at its rear end which tilts the ring 19 to start the action thereof when the rear piston block 17 is brought into operation. The cylinder 89 which resets the ring 19 from vertical to the tilted position is in communication with the valve 153 at all positions of the valve by means of a port, as shown in Figs. 29 and 38.

The clutch mechanism, generally referred to by the numeral 20, is of generally conventional form, the same involving the two head plates 93—94 (Fig. 31), the plate 93 being connected to the sleeve 61 to which the rear piston block 17 is secured, while the head plate 94 is secured by a pin 95 to the driven shaft 13. Guide pins 97 bridge the plates 93—94 and extend through the slidable clutch plates 98. Pins 99 also extend through these plates 98, while clutch plates 100 are interposed between the plates 98 and are splined to the drive shaft 12, as at 102. Levers, equal in number to the number of pins 99, are denoted by numeral 103 and are rockably supported, as at 104, each being provided with an offset end 105 for engagement against the circumferentially grooved collar 106 splined to the sleeve 61. The outer end of each of these levers 103 is connected to the corresponding pin 99 by a pin and slot connection 107 and as is clearly shown in Figure 31, each of these pins 99 is provided with a stop collar 108 thereon between the plates 93—94, while interposed between each of these collars 108 and the plate 93 is an expansible coiled spring 109 which is retained under compression so that the plates 98 and 100 are separated by means of the collar 106 which is urged toward the plate 93 when the clutch is disengaged with the parts as shown in Figure 38.

As is clearly shown in Figure 30, a shaft 110 is disposed horizontally in the casing 10 and carries a pair of levers 111—111, each provided with a trunnion 112 for engagement into the grooved collar 106 of the clutch mechanism. An elongated arm 113 depends from the shaft 110 and is connected by way of the link 114 to the bell crank 115 which has a roller 116 at its free end and which is fulcrumed, as at 115'.

The housing 65 of the rear ring assembly 19 has a lever 118 (Fig. 3) extending therefrom. A pivotal link connection 119 extends from this lever 118 to a point 120 on link 114 at or near which point the link 121 also connects at one end. (These points are shown separate in Fig. 38 for purposes of clearness.) The other end of this link 121 connects to the upper end of the swingable arm 122, as at 123, forming a toggle joint. A coiled extensible spring 124 serves to maintain this joint 123 either in broken or unbroken position. This joint can be broken rearwardly by projection of the aforementioned rod 86 extending from the lever 70 on forward ring assembly 15.

For controlling the clutch manually and for utilizing the mechanism as a brake and also for reverse action, a cam assembly, generally referred to by numeral 126 (Fig. 38), is employed and includes the cams 21 and 22. This assembly involves a guideway 127 for the pair of connected blocks 128—129 of the cams 22—21, respectively, provided with cam faces 130', 130.

The roller 116 of the bell crank 115 is engageable with the face 130 of the cam 129 for manual operation of the clutch 20, when in high. It will be understood that when in high, if it is desired to stop suddenly, the brake pedal 7 will be depressed, which slides block 126 rearwardly operating bell crank lever 115, opening clutch 20 and tilting ring 19 from vertical to maximum slant.

The face 130' of the cam 128, when actuated by foot pedal 7, operates the pin 132 of the valve drum 18 (Figs. 5 and 6), the construction of which will be described hereinafter.

Referring to the mechanism for operating the cam assembly 126, numeral 133 represents a shaft extending inwardly of the casing 10 and to which an arm 134 is secured at its inner end. A pivotal link 135 is interposed between this arm 134 and the forward end of the cam assembly 126 and a coiled spring 136 serves to maintain the cam assembly normally urged forwardly, that is, to the position shown in Figure 38 and against the stop 137.

The outer end of the shaft 133 is provided with the aforementioned clutch pedal 7, as shown in Figure 1, and which also functions as a brake pedal. Furthermore, pedal 7 also acts as a reverse pedal, that is, when the laterally disposed head 138' of the turn rod 138 is displaced from the path of the foot pedal 7, and this may be managed by a suitable handle 139 on this rod 138. (See Figure 1.) In other words, only one manual control is employed for the entire transmission, including reverse action, as well as brake and clutch action.

As before stated, the piston block 16 and its associated mechanism serves as a pump for pumping oil or other fluid having a suitable level in the lower portion of the casing 10 under compression through the drum 18 and into the block 17, to the end that the pistons in the block 17, will operate.

As is clearly shown in Figures 5 and 6, numeral 140 represents the cylindrical shell of the drum 18 and this is divided vertically by a partition 141 (Fig. 10), dividing the interior of the drum into a pump side and a motor side. This drum, on the pump side, as shown in Figure 5, has an inlet tube 142 for the fluid and furthermore, this side of the drum has a vertically extending partition 143 at right angles to the partition 141. Thus the pump side of the drum is divided into the chambers 144 and 145.

The motor side of the drum (Fig. 6) has a partition 146 extending from the hub 60 downwardly to the lower portion of the shell 140, while a curved partition 147 extends from the upper portion of the hub 60 to meet the cylinder 148 slightly below an opening 149 therein. Thus the motor side of the drum is divided into the chambers 150 and 151. The opposite ends of the drum 18 are provided with segmental shaped openings 152, there being one of these openings 152 for each of the chambers 144, 145, 150 and 151.

As is clearly shown in Figures 5 and 6, the cylinder 148 is substantially tangentially disposed with respect to the shell 140 and has a piston-like hollow valve element 153 splined therein.

Numeral 154 represents the exhaust pipe which is connected to the cylinder 148 at the openings 155—156 vertically spaced in the cylinder and corresponding to the elongated openings 157—158 in the valve element 153. As is clearly shown in Figure 6, the interior of the piston valve 153 is divided by the horizontal partition 159 into the upper chamber 160 and the lower chamber 161. The aforementioned pin or cam rider 132 shown in Figure 38, depends from this piston valve 153 and is capable of riding on the cam face 130' of the cam 22 to regulate the position of the valve piston.

Figure 37 discloses a lay-out of the piston valve wall. On the pump side, there is the elongated opening 162 which covers two positions of the three stages of the valve, as well as the lower elongated opening 163. The three positions of the valve 153 are forward, neutral or braking and reverse. These openings 162 and 163 are complementary to the short openings 164—165 respectively of the cylinder 148 on the pump side, while on the motor side of the piston valve is located the elongated opening 166 which will cover all three stages of the valve, which is complementary to the single stage opening 167 in the shell 148, while above this is located the pair of single stage openings 168 and 169 complementary to the single opening 149 on the motor side of the cylinder 148. A coiled compressible spring 170, shown in Figure 38, serves normally to urge the valve piston 153 downwardly so that the rider 132 will engage the level portion of the cam assembly 126.

Assuming the control valve 153 is in position for forward motion as shown in Figs. 5 and 6, when the pump assembly 16 is in operation, it sucks fluid up through the inlet pipe 142 (see Figure 5) and transfers the same from the chamber 144 through one port 152 into the cylinders of the pump block 16 which carry the oil around from one port 152 to the other port 152 through which the oil passes into the chamber 145 from where it passes out by way of the openings in the cylinder 148 and piston valve 153 at the lower chamber 161 to the motor side of the drum 18, at which side it enters the chamber 151, where it acts on the pistons of the piston assembly 17, as shown in Figure 38.

The fluid is exhausted by way of the upper chamber 160 of the piston valve 153 and the exhaust pipe 154. Reverse operation of the mechanism takes place when the cam assembly 126 is shifted so that the rider 132 reaches a point on flat top of the face 130' of the cam block 22. This closes ports 163—165, registers ports 162—164, registers ports 149—169, ports 166—167 remaining open, registers port 158 with its exhaust port 156, and closes ports 155—157. This causes fluid to be sucked in at 142 and discharged into 145, through ports 162—164 into chamber 160, thence through ports 149—169 into chamber 150 from which it enters the cylinders of motor block 17 driving this block as a motor in the opposite direction. This then discharges into chamber 151 out through ports 166—167 into chamber 161, thence through port 158 to exhaust.

When the rider 132 is half way up, the ports 163—165 are open, ports 162—164 are open, ports 166—167 are open, but port 149 is closed, ports 155—157 are open and port 158 is open. In fact only one set of ports, namely, 149 is closed, but this causes the motor block 17 to lock. As the control valve moves from its lowermost position to the half-way position, the ports 149 are only part way closed, this causing a retarding action on the motor block 17.

On the cam block 22 is an extension 200 which has a seat 201 therein. Numeral 202 represents a lever fulcrumed, as at 203, to the casing 10 and provided with a laterally disposed arm 204 having a foot 205 which is in the path of the assembly 15 when the cam assembly 126 is operated. The lever 202 has a shoulder 206 adjacent its heel portion under which is engageable the pivotal finger 207 fulcrumed, as at 208, and a spring 209 serves to normally retain the heel 210 on this finger 207 snugly against the top of the block 22.

The function of this extension 200, arm 204 and finger 207 is to retain the brake in fully applied position and to release this brake automatically upon speeding up of the engine drive shaft 12. In operation, when the foot pedal 7 is operated, the cam assembly 126 is shifted rearwardly and the pin 132 rides up the inclined surface 130'. As the pin 132 reaches the half way position on this inclined surface 130', corresponding to the full brake application, the heel 210 will drop into the seat 201 on the extension 200, with the mid-portion of the finger 207 engaging under the shoulder 206. This will retain the heel 210 engaged in the seat 201, with the brake fully applied, or for parking purposes. All that is required in disengaging this brake retention means is to speed up the engine, which causes a movement of the assembly 15 from its upright position to its tilted position and in this movement engaging the foot 205 to shift the arm 204 so that the shoulder 206 will disengage from the finger 207 and permit the cam block 126 to regain the position shown in Figure 38. Thus the brake is released.

As shown in Figure 38, a rocker 220 is pivoted midway its length on the casing 10. A link 221 connects one end of this rocker 220 and has a roller riding in an annular slot 220' on the block assembly 17. The roller on link 221 is held in the slot 220' on the block 17 by a suitable support 221' extending out from the casing. A link 222 connects the other end of rocker 220 to the clutch yoke 111, so that when the brake is applied and the clutch is disengaged, the rearward motion of the yoke 111 will shift the rocker so that forward motion will be transmitted to the block assembly 17, pushing the latter against the drum 18.

Assume that the engine is idling with the brake off and the transmission is in "neutral". The parts will take the position shown in Fig. 38. Governor 14 has not yet started to operate so that the roller 37 is in the position $a$ in Fig. 20, causing the forward ring 15 to be in vertical position. The long and short block-operating rods 45 and 46 are in the position shown in Fig. 25 causing the pump block 16 to be spaced from valve drum 18 to insure absence of any pumping action. Motor block 17 contacts valve drum 18 and rear ring 19 is in the full inclined position, but since there is no pumping action of pump block 16, the car is stationary.

To start the car the engine throttle is opened, causing the governor 14 to operate sufficiently to move roller 37 through position $b$ to $x$, this serving to "kick" to inclined position the forward ring 15. The engagement of ring 15 with foot 205, releases the cam block assembly 126 in case the brake happens to be on. The slot 38 does not move sufficiently to engage pump block 16 with valve drum 18.

As the engine throttle is opened still wider, the roller 37 moves from position $x$ toward $c$ causing the car to gradually pick up speed. This causes the forward ring 15 to gradually incline from vertical to full tilt position. As roller 37 leaves point $x$ towards $c$, the slots 38 cause the pump drum 16 to engage valve drum 18 (Fig. 24). As the forward ring 15 tilts, the pumping action increases, causing the car to pick up speed.

After the car has picked up speed and the engine is moving sufficiently fast, the roller 37 reaches $c$ at which point the ring 15 has full tilt position, the same as rear ring 19. This gives a one-to-one or "high" speed ratio between drive shaft 12 and driven shaft 13.

As ring 15 reaches full tilt, it causes rod 86 to break the toggle 121—122, allowing the clutch springs 109 to engage clutch 20 and throw rear ring 19 to vertical position.

At the same time slots 38 have moved to the position shown in Fig. 23, causing, first, motor block 17 and then pump block 16 to separate from valve drum 18. This releases pressure in both pump and motor blocks as well as in resetting cylinder 89 which allows the rear ring 19 to take its vertical position.

Further increase of engine speed causes roller 37 to go from $c$ to $d$, causing the forward ring 15 to take vertical position. Thus the transmission is in "high" with driving and driven shafts mechanically connected, with both forward and rear rings 15 and 19 vertical and with both pump and motor blocks 16 and 17 spaced from valve drum 18. This reduces movement and friction of the transmission parts to minimum.

To "shift" to a lower speed, the engine is permitted to slow down to just above the control speed corresponding to a vehicle speed of, say, 22 miles an hour. As the engine slows down to control speed (which we may assume to be 20 miles an hour) the roller 37 moves from $d$ to $c$, thus forcing forward ring 15 to full tilt. At about this time, movement of slots 38 causes the pump and motor blocks 16 and 17 to contact valve drum 18. Pressure is then built up in pump block 16 and transmitted to motor block 17 and resetting cylinder 89. The latter causes rear ring 19 to move to full tilt position, disengages clutch 20, and resets the toggle 121—122. It will be understood that the link 114 is mounted in such a manner between bell crank lever 115 and arm 113 that, when moved rearwardly by rear ring 19, it straightens toggle 121—122 in which positon the latter is held by toggle spring 124. Thus an "intermediate" speed drive is obtained, the ratio of which depends on the position of forward ring 15.

To apply the brake while in "high", the foot pedal 7 is depressed, moving cam assembly 126. This operates two devices, one, bell crank 115 and, two, follower 132. As the bell crank 115 rides up cam surface 130 it disengages clutch 20, moves rear ring 19 from vertical to full tilt position, resets toggle 121—122, and moves motor block 17 into contact with valve drum 18 through linkage 220, 221, 222.

As the follower 132 moves up cam face 130', it moves piston valve 153 to gradually close appropriate ports, as explained above, thus giving a gradual braking action until the appropriate ports are closed at which point the car is "locked".

To reverse the car, handle 139 is operated, permitting pedal 7 to be depressed further. This causes the follower 132 to ride further up cam 130', moving piston valve 153 to give the reversing action, as explained above.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:—

1. In a variable speed transmission, a stationary casing, a driving shaft in said casing, a driven shaft, a pump unit and a motor unit in said casing, each unit comprising a cylinder block, a plurality of pistons in said block, a tiltable housing pivoted to said casing, a swash plate journalled in said housing, and connecting rods connecting said pistons and said swash plate, one of said swash plates and its corresponding cylinder block being secured to said driving shaft, the other of said swash plates and its corresponding cylinder block being secured to said driven shaft, a mechanical clutch between said shafts, said cylinder blocks being located between said tiltable housings, a stationary valve drum between said blocks, a control valve in said valve drum, means for shifting said valve to selective positions driving said motor unit ahead, in reverse, to lock said motor unit or to exert braking effort to said motor unit, means for varying the relative tilt between said housings to change the speed ratios, and means whereby both said housings occupy erect positions and said mechanical clutch engages for direct drive.

2. In a variable speed transmission, a stationary casing, a driving shaft in said casing, a driven shaft, a pump unit and a motor unit in said casing, each unit comprising a cylinder block, a plurality of pistons in said block, a tiltable housing pivoted to said casing, a swash plate journalled in said housing, and connecting rods connecting said pistons and said swash plate, one of said swash plates being secured to said driving shaft, the other of said swash plates being secured to said driven shaft, a mechanical clutch engageable between said shafts, said cylinder blocks being located between said housings, a stationary valve drum between said blocks, a cylindrical piston valve in said valve drum, means for shifting said valve to selective positions for driving said motor unit ahead, in reverse, to lock said motor unit, or to exert braking effort on said motor unit, means for shifting said blocks with respect to said valve drum to kill pressure, said tiltable pump housing occupying an erect position and said tiltable motor housing occupying a full tilt position for neutral, said pump housing occupying various angles of tilt to full tilt position with said motor housing in full tilt position for various speeds up to direct drive, and means whereby both said housings occupy erect positions and said mechanical clutch engages for direct drive.

3. In a variable speed transmission, a variable stroke motor unit and a variable stroke pump unit, each unit comprising a set of cylinders and a tiltable swash plate cooperating therewith, said pump unit being driven by a source of power and said motor unit driving a load, a governor responsive to change of condition of said transmission, means for transferring fluid from one set of cylinders to the other, power devices controlled by said governor for tilting the pump swash plate from erect position to full oblique position for varying the speed of the motor unit from zero to maximum, the motor swash plate occupying a full oblique position for all speeds from zero to maximum, and power devices controlled by said governor for mechanically connecting the pump unit and the motor unit and for tilting both said swash plates back to erect position for direct drive.

4. The combination according to claim 3 in which the governor is responsive to the speed of rotation of said pump unit.

5. In a variable speed transmission, a motor unit and a pump unit, each comprising a rotary cylinder block and a tiltable swash plate rotating therewith, a mechanical clutch for connecting said units, a manually operated brake element for manually moving said motor swash plate from erect position, means immediately moving said motor swash plate to full tilt position irrespective of the extent of operation of said brake element, and means controlled by said brake element for throttling the fluid compressed by the motor unit to obtain braking action.

6. In a variable speed transmission, a stationary support, a driving shaft on said support, a driven shaft on said support, a pump unit and a motor unit on said support, each unit comprising a cylinder block, a plurality of pistons in said block, a tiltable housing pivoted to said support, a swash plate journalled in said housing, and connecting rods connecting said pistons and said swash plate, one of said swash plates being secured to said driving shaft, the other of said swash plates being secured to said driven shaft, a mechanical clutch between said shafts, said cylinder blocks being located between said tiltable housings, a valve casing between said blocks, a control device in said valve casing for controlling the rotational movement of said motor unit, means for varying the relative tilt between said housings to change the speed ratios between said shafts, and means for bringing both said housings back to erect positions and for engaging said mechanical clutch for direct drive.

7. In a variable speed transmission, a stationary casing, a driving shaft in said casing, a driven shaft, a pump unit and a motor unit in said casing, each unit comprising a cylinder block, a plurality of pistons in said block, a tiltable housing pivoted to said casing, a swash plate journalled in said housing, and connecting rods connecting said pistons and said swash plate, one of said swash plates being secured to said driving shaft, the other of said swash plates being secured to said driven shaft, a mechanical clutch between said shafts, said cylinder blocks being located between said tiltable housings, a stationary valve casing between said blocks, a control valve in said valve casing, means for shifting said valve to selective positions driving said motor unit or locking said motor unit or exerting braking effort on said motor unit, means for varying the relative tilt between said housings to change the speed ratios, and means whereby both said housings occupy erect positions and said mechanical clutch engages for direct drive.

8. In a variable speed transmission, a variable stroke motor unit and a variable stroke pump unit, each unit comprising a rotary cylinder block and a tiltable swash plate rotating therewith, said pump unit being driven by a source of power and said motor unit driving a load, a governor responsive to changes of condition of the transmission, a stator between said cylinder blocks for transferring fluid from one cylinder block to the other, a brake device in said stator, power devices controlled by said governor for tilting the pump swash plate from erect position to full oblique position for varying the speed of the motor unit from zero to maximum, the motor swash plate occupying a full oblique position for all speeds from zero to maximum, power devices controlled by said governor for mechanically connecting the pump unit and the motor unit and for tilting both said swash plates back to erect position for direct drive, and a manually governed brake element for tilting said motor swash plate from erect to oblique position and for operating said brake device to throttle the fluid compressed by said motor unit thereby to cause said motor unit to act as a brake.

9. In a variable speed transmission, a variable stroke motor unit and a variable stroke pump unit, each unit comprising a rotary cylinder block and a tiltable swash plate rotating therewith, said pump unit being driven by a source of power and said motor unit driving a load, a speed responsive governor running with said pump unit, a stator between said cylinder blocks for transferring fluid from one cylinder block to the other, a brake device in said stator, power devices controlled by said governor for tilting the pump swash plate from erect position to full oblique position for varying the speed of the motor unit from zero to maximum, the motor swash plate occupying a full oblique position for all speeds from zero to maximum, power devices controlled by said governor for mechanically connecting the pump unit and the motor unit and for tilting both said swash plates back to erect position for direct drive, and a manually governed brake element for tilting said motor swash plate from erect to oblique position and for operating said brake device to throttle the fluid compressed by said motor unit thereby to cause said motor unit to act as a brake.

10. In a variable speed transmission, a motor unit and a pump unit each comprising a rotary cylinder block and a tiltable swash plate rotating therewith, a mechanical clutch for connecting said units, a transfer block between said cylinder blocks for transferring the liquid between blocks, means for holding said cylinder blocks in close engagement with said transfer block when power is being transmitted from one cylinder block to the other, and means for reducing friction between said cylinder blocks and said transfer block when said mechanical clutch engages for direct drive.

11. In a variable speed transmission, a motor unit and a pump unit each comprising a set of cylinders and a tiltable swash plate, a mechanical clutch for connecting said units, a transfer element between said sets of cyilnders for transferring the liquid from one set of cylinders to the other, means for holding said sets of cylinders in close engagement with said transfer element when power is being transmitted from one set of cylinders to the other, and means for spacing said sets of cylinders from said transfer element when said mechanical clutch engages for direct drive, said sets of cylinders and said transfer element being relatively rotatable.

12. In a variable speed transmission, a variable stroke motor unit and a variable stroke pump unit, each unit comprising a set of cylinders and a controllable carrier ring cooperating therewith, said pump unit being driven by a source of power and said motor unit driving a load, a governor responsive to change of condition of said transmission, means for transferring driving fluid from one set of cylinders to the other, power devices controlled by said governor for moving the pump carrier ring from zero stroke position to full stroke position for varying the speed of the motor unit from zero to maximum, the motor carrier ring occupying a full stroke position for all speeds from zero to maximum, and power devices controlled by said governor for mechanically connecting the pump unit and the motor unit and for moving both said carrier rings back to zero stroke position for direct drive.

DAVID S. BENNETCH.